US009162296B2

(12) United States Patent
Athad

(10) Patent No.: US 9,162,296 B2
(45) Date of Patent: Oct. 20, 2015

(54) CHAMFERING CUTTER AND CHAMFERING INSERT THEREFOR

(75) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 484 days.

(21) Appl. No.: 13/590,721

(22) Filed: Aug. 21, 2012

(65) Prior Publication Data

US 2014/0056659 A1 Feb. 27, 2014

(51) Int. Cl.
*B23C 5/14* (2006.01)
*B23C 5/20* (2006.01)
*B23C 5/08* (2006.01)
*B23C 5/22* (2006.01)

(52) U.S. Cl.
CPC . *B23C 5/08* (2013.01); *B23C 5/207* (2013.01); *B23C 5/22* (2013.01); *B23C 2210/161* (2013.01); *B23C 2220/16* (2013.01); *B23C 2220/36* (2013.01); *Y10T 407/1934* (2015.01); *Y10T 407/2282* (2015.01); *Y10T 407/23* (2015.01)

(58) Field of Classification Search
CPC .......... B23C 5/08; B23C 5/06; B23C 5/2221; B23C 2200/0416; B23C 2200/0438; B23C 2200/0461; B23C 2200/0483
USPC ............................................. 407/47, 107, 113
See application file for complete search history.

(56) References Cited

U.S. PATENT DOCUMENTS

| 3,466,720 | A | * | 9/1969 | Stier | 407/113 |
| 3,762,005 | A | * | 10/1973 | Erkfritz | 407/113 |
| 6,071,045 | A | * | 6/2000 | Janness | 407/42 |
| 6,270,292 | B1 | * | 8/2001 | Satran et al. | 407/42 |
| 7,168,895 | B2 | * | 1/2007 | Koskinen et al. | 409/140 |
| 8,157,486 | B2 | * | 4/2012 | Hecht | 407/5 |
| 8,177,459 | B2 | * | 5/2012 | Hughes et al. | 407/40 |
| 8,647,027 | B2 | * | 2/2014 | Men | 407/103 |
| 2002/0112590 | A1 | | 8/2002 | Bohner et al. | |

FOREIGN PATENT DOCUMENTS

WO 99/28073 6/1999
WO WO 99/28073 A1 6/1999

OTHER PUBLICATIONS

International Search Report dated Dec. 20, 2013 issued in PCT counterpart application (No. PCT/IL2013/050665).

\* cited by examiner

*Primary Examiner* — Will Fridie, Jr.
(74) *Attorney, Agent, or Firm* — Womble Carlyle

(57) ABSTRACT

A chamfering insert has an elongated shape with a longitudinal insert axis and includes two opposite end portions and a cylindrically shaped insert peripheral surface which extends therebetween. The chamfering insert has a cutting edge, first and second opposite insert abutment surfaces, each of which extends perpendicularly to the insert axis, and an insert anti-rotation surface which extends parallel to the insert axis. The insert anti-rotation and abutment surfaces are located on one side of an imaginary plane, and the cutting edge is located, separately therefrom, on an opposite side of the imaginary plane.

18 Claims, 2 Drawing Sheets

CHAMFERING CUTTER AND CHAMFERING INSERT THEREFOR

FIELD OF THE INVENTION

The subject matter of the present application relates to metal milling tools for slotting, or slotting cutters. Specifically, it relates to chamfering cutters.

BACKGROUND OF THE INVENTION

Milling tools of the field are known and disclosed, for example, in WO 99/28073.

SUMMARY OF THE INVENTION

In accordance with the subject matter of the present application there is provided a chamfering insert having an elongated shape with a longitudinal insert axis, and comprising:

two opposite end portions and a cylindrically shaped insert peripheral surface extending therebetween;

first and second opposite insert abutment surfaces, each extending from the insert peripheral surface in a direction perpendicular to the insert axis, an insert anti-rotation surface extending away from a respective adjacent insert abutment surface, in a direction parallel to the insert axis, towards an adjacent end portion; and at least one cutting edge;

wherein the chamfering insert has an imaginary plane which is parallel to the insert axis; and wherein the insert anti-rotation and abutment surfaces are located on one side of the imaginary plane, and the cutting edge is located, separately therefrom, on an opposite side of the imaginary plane.

In accordance with the subject matter of the present application there is further provided a chamfering cutter comprising a cutter body and the chamfering insert, secured in a chamfering pocket of the cutter body.

In the chamfering cutter:

the cutter body has two opposite body side surfaces;

the chamfering pocket is elongated in a thickness direction of the cutter body and opens out to at least one body side surface, the chamfering pocket comprising a pocket peripheral surface, an integral pocket abutment surface and an integral pocket anti-rotation surface;

the cutter body has a clamping pocket adjacent to, and associated with, the chamfering pocket, the clamping pocket being elongated in the thickness direction of the cutter body, the clamping pocket accommodating a clamping member configured to force the chamfering insert in the thickness direction of the cutter body;

the insert peripheral surface at least partially abuts the pocket peripheral surface;

the insert anti-rotation surface abuts the pocket anti-rotation surface;

the first insert abutment surface abuts the pocket abutment surface; and the clamping member engages the second insert abutment surface and forces it against the pocket abutment surface.

Any of the following features, either alone or in combination, may be applicable to any of the above aspects of the subject matter of the application:

The cutting insert can include a width cutout which can be elongated perpendicularly to the insert axis and can comprise the insert anti-rotation and abutment surfaces.

The chamfering insert can include a through length cutout which can be elongated longitudinally and can comprise first and second planes which can be parallel to the insert axis; and wherein the first plane can be transverse to the imaginary plane.

The cutting edge can lie in the first plane.

The insert abutment surfaces can be located between the end portions.

The insert anti-rotation surface can be planar.

The chamfering insert can have two cutting edges and two insert anti-rotation surfaces.

The chamfering cutter can comprise a slotting insert secured in a slotting pocket in the cutter body.

The pocket anti-rotation and abutment surfaces are located only on one side of the cutter body.

The pocket anti-rotation surface can be planar.

The cutter body can have a disk-like shape.

None of the end surfaces or the end portions contacts any portion of the cutter body or of the clamping member.

BRIEF DESCRIPTION OF THE DRAWINGS

For a better understanding of the subject matter of the present application and to show how the same may be carried out in practice, reference will now be made to the accompanying drawings, in which.

Figure 1:
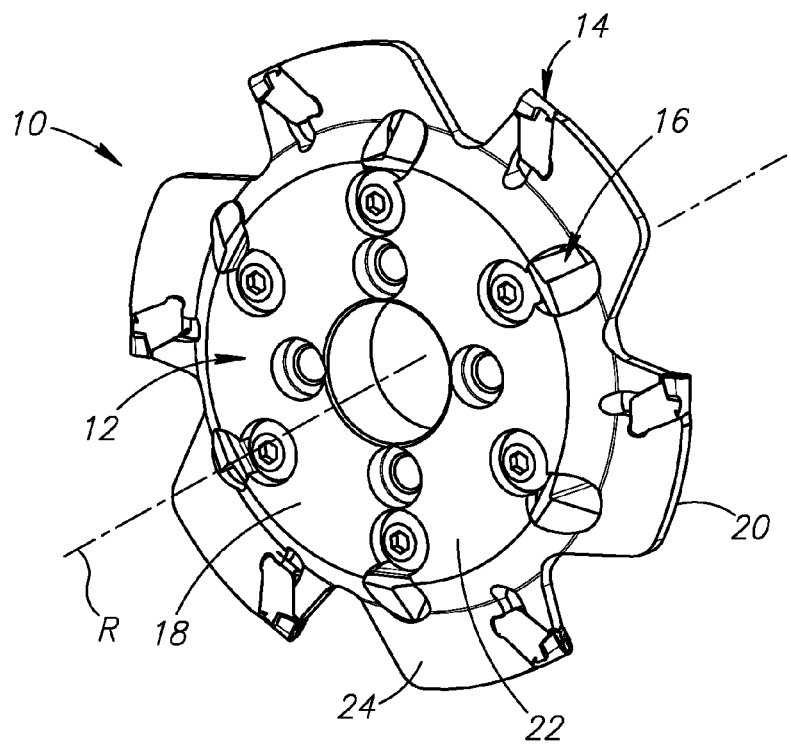
FIG. 1 is an isometric view of an assembled chamfering cutter.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
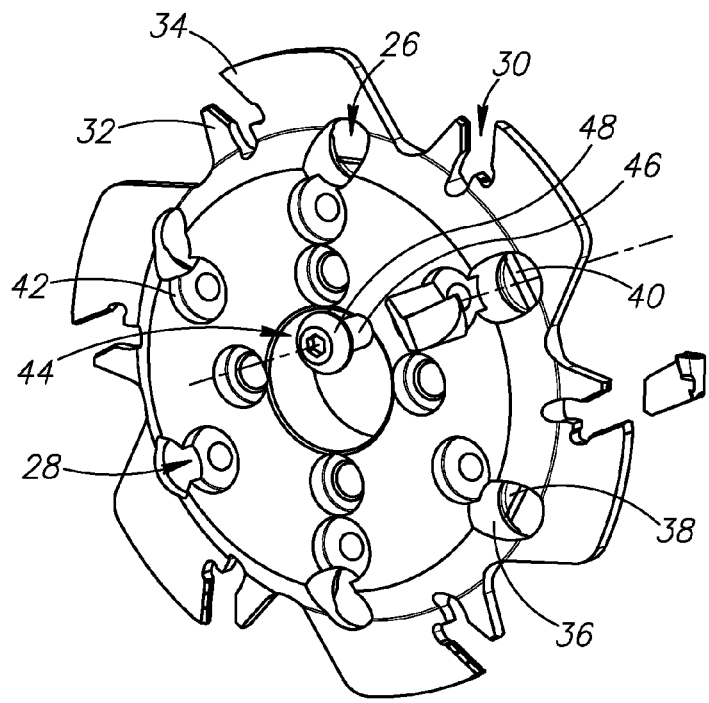
FIG. 2 is an isometric partial exploded view of a the slotting cutter of FIG. 1.

Reference is made to FIGS. 1 and 2. A chamfering cutter 10 includes a cutter body 12 and slotting and chamfering inserts 14, 16 secured thereto. In the present example, the chamfering cutter 10 includes, but not limited to, six slotting inserts 14 and six chamfering inserts 16.

The cutter body 12 can have a disk-like shape, and has two opposite body side surfaces 18 and a body peripheral surface 20 which extends therebetween. The cutter body 12 has midplane P located midway between the body side surfaces 18. According to the present example, in a plan view of the cutter body 12, each body side surface 18 can have a circular shape. The cutter body 12 can have a body rotation axis R, about which the cutter body 12 can have rotational symmetry. In this example, the cutter body 12 has an inner thick portion 22 adjacent the rotation axis R and an outer thin portion 24 located between the thick portion 22 and the body peripheral surface 20. Furthermore, the cutter body 12 is asymmetric with respect to the mid-plane P, as will be further explained.

According to the subject matter of the present application, the cutter body 12 has six chamfering pockets 26, six clamping pockets 28 and six slotting pockets 30.

The slotting pockets 30 can be located adjacent the body peripheral surface 20. The slotting pockets 30 can be located within the outer thin portion 24. Furthermore, the slotting pockets 30 can be located closer to the body peripheral surface 20 than the chamfering inserts 16. Each slotting pocket 30 can include a resilient first jaw 32 connected to a fixed second jaw 34 which are configured to clamp the slotting insert 14 securely therein.

According to the present example, each chamfering pocket 26 is elongated perpendicularly to the mid-plane P, in a thickness direction of the cutter body 12. Each chamfering pocket 26 has a longitudinal, pocket axis K which can be perpendicular to the mid-plane P. Each chamfering pocket 26 can open out to both body side surfaces 18. The chamfering pocket 26 can have a pocket peripheral surface 36 which extends between the body side surfaces 18. Inner-most portions of the pocket peripheral surface 36 can lie in a periphery of an imaginary circular cylinder which is co-axial with the pocket axis K. Stated differently, portions of the pocket peripheral surface 36 which are closest to the pocket axis K can lie in the periphery of the imaginary cylinder. In the present example, the pocket peripheral surface 36 has a circular cylindrical shape.

On one side of the mid-plane P, the chamfering pocket 26 can include an integral pocket abutment surface 38 which faces towards the mid-plane P, and an integral pocket anti-rotation surface 40, both of which can be planar. The pocket anti-rotation surface 40 can extend between the body side surface 18 and the pocket abutment surface 38. The pocket abutment surface 38 can extend between the pocket anti-rotation surface 40 and the pocket peripheral surface 36. The pocket anti-rotation surface 40 can be parallel to the pocket axis K, and the pocket abutment surface 38 can be perpendicular to the pocket axis K. The pocket abutment surface 38 can be closer to the mid-plane P than the pocket anti-rotation surface 40.

Figure 3:
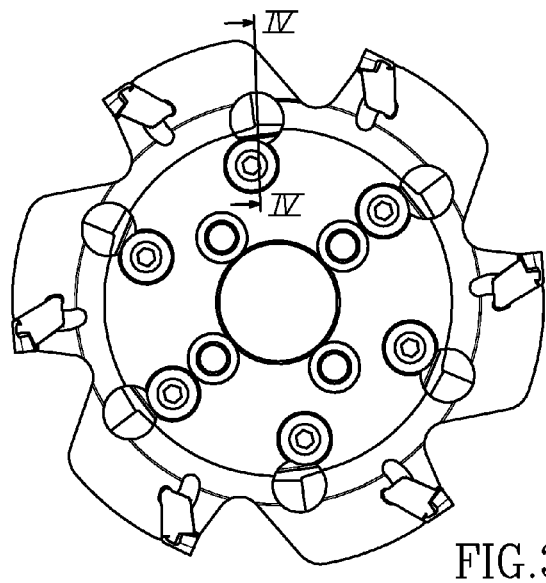
FIG. 3 is a plan side view of the chamfering cutter of FIG. 1.
Figure 4:
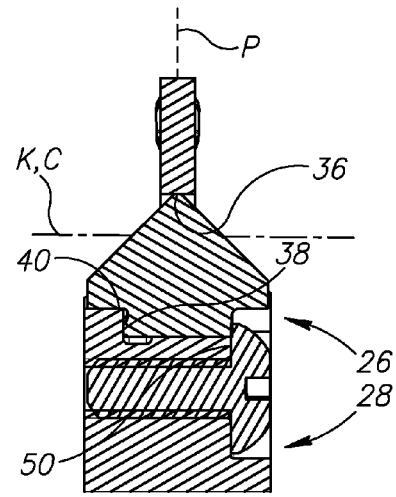
FIG. 4 is a cross sectional view taken along line IV-IV of FIG. 3.

Attention is drawn to FIGS. 3 and 4. Each clamping pocket 28 is elongated perpendicularly to the mid-plane P and can open out to both body side surfaces 18. In the present example each clamping pocket 28 includes a female thread and a countersink 42 which is located, in this example, on one of the body side surfaces 18. Each clamping pocket 28 can include a clamping member 44. According to the present example, the clamping member 44 is a screw. The clamping member 44 has an elongated clamping member body 46 extending from a clamping member head 48. The clamping member body 46 can have a male thread which is screw threaded in the female thread of the clamping pocket 28. The clamping member head 48 has a clamping member abutment surface 50 which faces the clamping member body 46.

Each clamping pocket 28 is associated, or paired with, one respective chamfering pocket 26. Each clamping pocket 28 is located adjacent a chamfering pocket 26, such that the clamping member 44, or specifically the clamping member abutment surface 50, can engage the chamfering insert 16 and secure it in the chamfering pocket 26 (FIG. 4). Furthermore, by directing the clamping pocket 28 perpendicularly to the mid-plane P, the force applied on the chamfering insert 16 can be advantageously maximized. In other words, most clamping force that the screw can generate is applied in the direction perpendicular to the mid-plane P.

Figure 5:
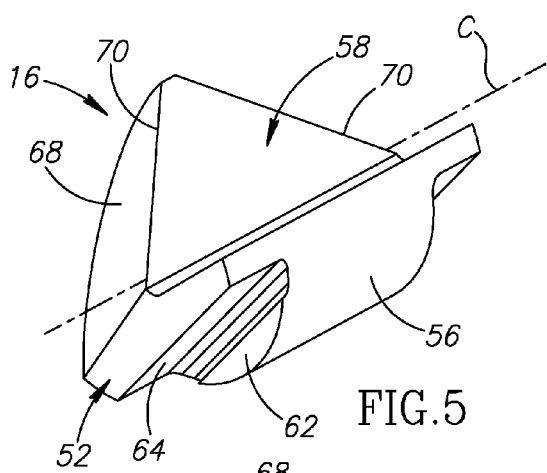
FIG. 5 is an isometric view of a chamfering insert.
Figure 7:
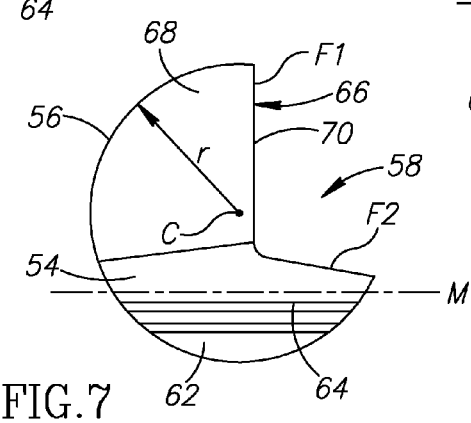
FIG. 7 is an end view of the chamfering insert of FIG. 5.
Figure 6:
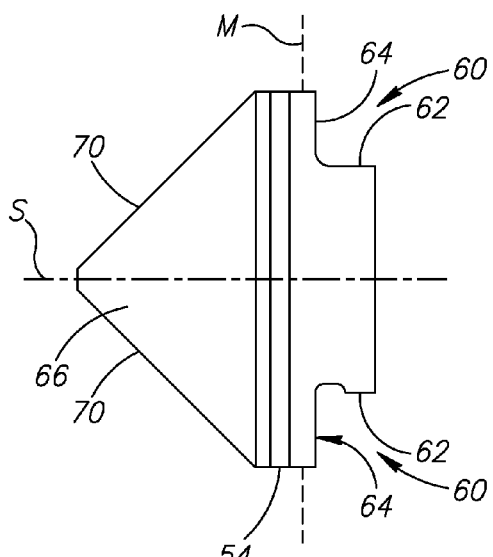
FIG. 6 is a side view of the chamfering insert of FIG. 5.

Attention is now drawn to FIGS. 5 to 7. Each chamfering insert 16 has an elongated shape with a longitudinal insert axis C and an imaginary plane M which is parallel thereto. Each chamfering insert 16 can include two opposite end portions 52, each of which includes an end surface 54 which can be perpendicular to the insert axis C. An insert peripheral surface 56 extends between the two opposite end portions 52. As best seen in the end view of FIG. 7, the insert peripheral surface 56 has a circular part-cylindrical shape which may be centered about the insert axis C and have a surface radius r. Also in the end view of the insert 16, the insert peripheral surface 56 subtends over a sizeable majority of the circumference centered about the insert axis C. Preferably, the insert peripheral surface 56 subtends between 230° and 270° of the circumference.

According to the present example, each chamfering insert 16 includes a single through length cutout 58 and can include two through width cutouts 60. The length cutout 58 is elongated parallel to the insert axis C and the width cutouts 60 are elongated perpendicular to the insert axis C. The length cutout 58 can include first and second transverse planes F1 and F2 which extend between the two end portions 52 and are parallel to the insert axis C. As seen in FIG. 7, the length cutout 58 does not include the center axis C in the present example, though this may be the case in other instances.

The chamfering insert 16 can have two opposite insert abutment surfaces 62 and can have two insert anti-rotation surfaces 64. As best seen in FIGS. 5 and 6, each insert abutment surface 62 is recessed, relative to an end surface 54 of a respective end portion 52, in a longitudinal direction of the cutting insert along the insert axis C. The insert anti-rotation and abutment surfaces 62, 64 can be planar. Each width cutout 60 includes a single insert abutment surface 62 and a single insert anti-rotation surface 64. This can be advantageous, since both of these surfaces can be machined, or ground with one pass of a grinding wheel, which can lower production costs. Each insert anti-rotation surface 64 extends from a respective end surface 54 at a respective end portion, parallel to the insert axis C, and meets with a respective insert abutment surface 62. The insert abutment surface 62 extends from the insert anti-rotation surface 64, away from, and perpendicular to, the insert axis C, and meets with the insert peripheral surface 56. Each insert abutment surface 62 is located between the end portions 52, adjacent a respective end portion. The geometric separation between the insert anti-rotation surface 64 and the insert abutment surface 62 can be advantageous in terms of abutment stability and against rotation of the chamfering insert 16 when in the chamfering pocket 26. In other words, anti-rotation forces are applied separately from abutment forces which can improve stability.

According to the subject matter of the present application, each chamfering insert 16 has two rake surfaces 66 and two relief surfaces 68. Both rake surfaces 66 are located on the first plane F1. Each relief surface 68 extends transversely from the insert peripheral surface 56 and intersects a respective rake surface 66 of the first plane F1 at a cutting edge 70. A possible advantage of the through length cutout 58, is that both cutting edges 70 are machined at once, with one pass of a grinding wheel, which can lower production costs.

As best seen in the side view of FIG. 6 in the present example, the insert 16 may exhibit mirror symmetry about an insert bisector plane S which is perpendicular to the insert axis C and passes midway between the end portions 52. It is noted however, that in other examples the insert may not have such mirror symmetry. Thus, the subject matter of the present application also contemplates a cutting insert having a pair of cutting edges, each cutting edge being sloped at a different angle and/or having a different length, so as to cut correspondingly different chamfers on opposite sides of a groove. In addition, the subject matter of the present application also contemplates having a single cutting edge 70 so that the tool is configured to cut a chamfer only on one side of a groove. In such case, the two end surfaces 54 on opposite end portions 52 need not be mirror images of one another, and/or only one insert anti-rotation surface 64 may be provided.

In the present example, the length cutout 58 is located on one side of the plane M, and the width cutouts 60 are located, separately, on an opposite side of the plane M. More specifically, the cutting edges 70 are located on one side of the plane M, and the insert anti-rotation and abutment surfaces 62, 64 are located, separately, on the opposite side of the plane M. In other words, the clamping forces securing the chamfering insert 16 in the chamfering pocket 26 are applied on one side of the chamfering insert 16, while the machining forces applied on the opposite side. This isolation of the cutting edges 70 from the insert anti-rotation and abutment surfaces 62, 64 was found to be advantageous in terms of stability during machining. Furthermore, another possible advantage is the fact that during machining, the machining forces are not directed towards, and therefore, do not affect the clamping member, or the clamping means.

According to the present example, in an assembled position, each chamfering insert 16 is secured in its respective chamfering pocket 26 and each slotting insert 14 is secured in its respective slotting pocket 30. The insert peripheral surface 56 abuts the pocket peripheral surface 36. A first insert abutment surface 62 abuts the pocket abutment surface 38. The insert anti-rotation surface 64 abuts the pocket anti-rotation surface 40. And the screw abutment surface abuts a second insert abutment surface 62.

According to the present disclosure, none of the end surfaces 54 or the end portions 52 contacts any portion of the cutter body 12 or the clamping member 44. Furthermore, in the assembled position, the insert and pocket abutment surfaces are located inwards, between the body side surfaces 18. This may be advantageous in cases where the slotting cutter has a thickness limitation.

The description above includes exemplary embodiments and details for enablement, if needed, of claimed subject matter, and does not exclude non-exemplified embodiments and details from the claim scope of the present application.

What is claimed is:

1. A chamfering insert (16) having an elongated shape with a longitudinal insert axis (C), and comprising:
   two opposite end portions (52) and a part-cylindrically shaped insert peripheral surface (56) extending therebetween;
   first and second opposite insert abutment surfaces (62), each extending from the insert peripheral surface (56) in a direction perpendicular to the insert axis (C),
   an insert anti-rotation surface (64) extending away from a respective adjacent insert abutment surface (62), in a direction parallel to the insert axis (C), towards an adjacent end portion; and
   at least one cutting edge (70);
   wherein:
   the chamfering insert (16) has an imaginary plane (M) which is parallel to the insert axis (C);
   the insert anti-rotation and abutment surfaces (62, 64) are located on one side of the imaginary plane (M), and the cutting edge (70) is located, separately therefrom, on an opposite side of the imaginary plane (M);
   the chamfering insert (16) includes a through length cutout (58) which is elongated longitudinally and comprises first and second planes (F1, F2) which are parallel to the insert axis (C); and
   wherein the first plane (F1) is transverse to the imaginary plane (M).

2. The chamfering insert (16) according to claim 1, wherein the cutting insert includes a width cutout (60) which is elongated perpendicularly to the insert axis (C) and comprises the insert anti-rotation and abutment surfaces (62, 64).

3. The chamfering insert (16) according to claim 1, wherein each cutting edge (70) lies in the first plane (F1).

4. The chamfering insert (16) according to claim 1, wherein the insert abutment surfaces (62) are located between the end portions (52).

5. The chamfering insert (16) according to claim 1, wherein the insert anti-rotation surface (64) is planar.

6. The chamfering insert (16) according to claim 1, wherein the chamfering insert (16) has two cutting edges (70) and two insert anti-rotation surfaces (64).

7. The chamfering insert (16) according to claim 6, wherein the chamfering insert (16) exhibits mirror symmetry about an insert bisector plane (S) which is perpendicular to the insert axis (C) and passes midway between the opposite end portions (52).

8. The chamfering insert (16) according to claim 6, wherein each cutting edge is sloped at a different angle and/or has a different length.

9. The chamfering insert (16) according to claim 1, wherein:
   the two insert abutment surfaces (62) on opposite end portions (52) are not mirror images of one another; and/or
   the anti-rotation insert abutment surface (62) is formed only on one end portion (52).

10. The chamfering insert (16) according to claim 1, wherein each of the insert abutment surfaces (62) is recessed, relative to an end surface (54) of a respective end portion (52), in a longitudinal direction of the cutting insert along the insert axis (C).

11. A chamfering cutter (10) comprising a cutter body (12) and the chamfering insert (16) according to claim 1 secured in a chamfering pocket (26) of the cutter body (12).

12. The chamfering cutter (11) according to claim 11, wherein:
   the cutter body (12) has two opposite body side surfaces (18);
   the chamfering pocket (26) is elongated in a thickness direction of the cutter body (12) and opens out to at least one body side surface (18), the chamfering pocket (26) comprising a pocket peripheral surface (36), an integral pocket abutment surface (38) and an integral pocket anti-turn surface (40);
   the cutter body (12) has a clamping pocket (28) adjacent to, and associated with, the chamfering pocket (26), the clamping pocket (28) being elongated in the thickness direction of the cutter body (12), the clamping pocket (28) accommodating a clamping member (44) configured to force the chamfering insert (16) in the thickness direction of the cutter body (12);
   the insert peripheral surface (56) at least partially abuts the pocket peripheral surface (36);
   the insert anti-rotation surface (64) abuts the pocket anti-rotation surface (40);
   the first insert abutment surface (62) abuts the pocket abutment surface (38); and the clamping member (44) engages the second insert abutment surface (62) and forces it against the pocket abutment surface (38).

13. The chamfering cutter (10) according to claim 12, wherein the chamfering cutter (10) comprises a slotting insert (14) secured in a slotting pocket (30) in the cutter body (12).

14. The chamfering cutter (10) according to claim 12, wherein the pocket anti-rotation and abutment surfaces (38, 40) are located only on one side of the cutter body (12).

15. The chamfering cutter (10) according to claim 12, wherein the pocket anti-rotation (40) surface is planar.

16. The chamfering cutter (10) according to claim 12, wherein the cutter body (12) has a disk-like shape.

17. The chamfering cutter (10) according to claim 12, wherein none of the end surfaces (54) or the end portions (52) contacts any portion of the cutter body (12) or of the clamping member (44).

18. The chamfering insert (16) according to claim 1, wherein the part-cylindrically shaped insert peripheral surface (56) is centered about the longitudinal insert axis (C) and subtends between 230° and 270° of a circumference.

* * * * *